United States Patent
Tamura et al.

(10) Patent No.: US 11,582,142 B2
(45) Date of Patent: Feb. 14, 2023

(54) COMMUNICATION CONTROL METHOD, COMMUNICATION CONTROL DEVICE, AND COMPUTER PROGRAM

(71) Applicant: NTT Communications Corporation, Chiyoda-ku (JP)

(72) Inventors: Mahoko Tamura, Yokohama (JP); Yoshinao Kurihara, Tokyo (JP); Kazuki Oodo, Saitama (JP); Kento Ikeda, Kasukabe (JP); Hiroshi Sakoda, Chiba (JP); Takanori Mizuguchi, Tokyo (JP); Yasuhiro Hataya, Ichikawa (JP); Kazuki Sato, Tokyo (JP); Kaname Nishizuka, Tokyo (JP); Tomohiro Kimura, Chiba (JP); Masashi Sakurada, Tokyo (JP); Kyoko Onojima, Tokyo (JP)

(73) Assignee: NTT Communications Corporation, Chiyoda-ku (JP)

( * ) Notice: Subject to any disclaimer, the term of this patent is extended or adjusted under 35 U.S.C. 154(b) by 732 days.

(21) Appl. No.: 16/332,657

(22) PCT Filed: Sep. 20, 2017

(86) PCT No.: PCT/JP2017/033913
§ 371 (c)(1),
(2) Date: Mar. 12, 2019

(87) PCT Pub. No.: WO2018/061935
PCT Pub. Date: Apr. 5, 2018

(65) Prior Publication Data
US 2021/0306253 A1    Sep. 30, 2021

(30) Foreign Application Priority Data
Sep. 29, 2016    (JP) .............................. JP2016-192223

(51) Int. Cl.
*H04L 45/24* (2022.01)
*H04L 12/46* (2006.01)
(Continued)

(52) U.S. Cl.
CPC .......... *H04L 45/24* (2013.01); *H04L 12/4633* (2013.01); *H04L 63/1441* (2013.01); *H04L 67/02* (2013.01)

(58) Field of Classification Search
CPC ..... H04L 45/24; H04L 63/1441; H04L 67/02; H04L 12/4633
USPC .................................................. 709/238, 223
See application file for complete search history.

(56) References Cited

U.S. PATENT DOCUMENTS 7,389,537 B1 * 6/2008 Callon ................... H04L 47/10
713/153
8,619,780 B1 * 12/2013 Brandwine ........... H04L 45/025
370/392
(Continued)

FOREIGN PATENT DOCUMENTS

EP    2 977 910 A1    1/2016
JP    37477740 B2 * 12/2005
(Continued)

OTHER PUBLICATIONS

International Search Report dated Dec. 19, 2017 in PCT/JP2017/033913 filed Sep. 20, 2017 (with English language translation).
(Continued)

*Primary Examiner* — David R Lazaro
*Assistant Examiner* — Mariegeorges A Henry
(74) *Attorney, Agent, or Firm* — Oblon, McClelland, Maier & Neustadt, L.L.P.

(57) ABSTRACT

A communication control method which performs route control in a communication system comprising: a specific network constituting the Internet; a first network configured
(Continued)

to accommodate a specific device connected to the specific network; a second network provided between the specific network and the first network; and a processing device configured to perform predetermined processing on the basis of a packet transmitted between the specific network and the first network, the communication control method comprising: causing a path setting device in the communication system to execute a communication route-setting process comprised of, in accordance with first routing information defining a path leading from the first network to the specific network to be branched in the second network, controlling a path so that a first path of the branched path is set as a path via the processing device, and a second path of the branched path is set as a path leading to the specific network.

10 Claims, 7 Drawing Sheets

(51) Int. Cl.
*H04L 9/40* (2022.01)
*H04L 67/02* (2022.01)

(56) References Cited

U.S. PATENT DOCUMENTS

| | | | | |
|---|---|---|---|---|
| 2002/0009073 | A1* | 1/2002 | Furukawa | H04L 65/1069 370/352 |
| 2003/0076825 | A1* | 4/2003 | Guruprasad | H04L 45/02 370/389 |
| 2006/0050719 | A1 | 3/2006 | Barr et al. | |
| 2006/0136722 | A1 | 6/2006 | Ogura et al. | |
| 2011/0282570 | A1* | 11/2011 | Tanioka | G01C 21/3676 701/532 |
| 2013/0208599 | A1* | 8/2013 | Mashimo | H04L 45/42 370/238 |
| 2015/0085852 | A1* | 3/2015 | Mizutani | H04J 3/0667 370/350 |
| 2015/0350064 | A1 | 12/2015 | Kano et al. | |

FOREIGN PATENT DOCUMENTS

| | | |
|---|---|---|
| JP | 2006-180280 A | 7/2006 |
| JP | 2014-229982 A | 12/2014 |
| JP | 2015-32932 A | 2/2015 |
| JP | 2015-231059 A | 12/2015 |
| WO | WO 2016/148224 A1 | 9/2016 |

OTHER PUBLICATIONS

Hiroyuki Kitada, et al., "Implementation and evaluation of service function chaining method," The Institute of Electronics, Information and Communication Engineers, IEICE Technical Report, vol. 114, No. 139, Jul. 2014, 6 Pages (with English Abstract).
Extended European Search Report dated Jan. 22, 2020, in Patent Application No. 17855890.4, 8 pages.

* cited by examiner

COMMUNICATION CONTROL METHOD, COMMUNICATION CONTROL DEVICE, AND COMPUTER PROGRAM

TECHNICAL FIELD

The present invention relates to a path redirection technique in IP communication.

Priority is claimed on Japanese Patent Application No. 2016-192223, filed Sep. 29, 2016, the content of which is incorporated herein by reference.

BACKGROUND ART

Along with the expansion of the Internet, a sudden increase in access to corporate websites at the time of a business scandal and an increase in traffic as represented by distributed denial of service (DDoS) attacks have become a major concern to the Internet connected user network such as a corporate network (for example, refer to Patent Literature 1). As means for protecting a user network from such temporary bursts of traffic, network services such as a content delivery network (CDN) for offloading traffic outside of the user network and a cloud type DDoS protection service have become mainstream.

Such network services realize services by intentionally redirecting traffic originally leading to a specific device in an Internet connected user network to a network service provider network using a domain name system (DNS) or a border gateway protocol (BGP) and apply attack mitigation devices or the like in the provider network to clean the traffic.

When traffic redirection using the DNS is performed, an IP address relative to a host name of a user is mapped to an IP address of a network address translation (NAT) or proxy installed in a service provider network and traffic is redirected to a provider network. In the case of redirection using the BGP, traffic is redirected to a service provider network by advertising a longer address prefix route than that normally advertised by the user for the BGP route selection mechanism prefer more specific routes.

Aside from the DNS or the BGP redirection methods as described above, policy-based routing (PBR) is another method to redirect traffic within a network. The PBR method defines a policy to an interface on a router where the traffic passes through and the traffic matched to the policy to be forwarded to a specific interface on the same router according to the policy rule.

CITATION LIST

Patent Literature

[Patent Literature 1]
Japanese Unexamined Patent Application, First Publication No. 2014-229982

SUMMARY OF INVENTION

Technical Problem

In a redirection method using the DNS, the NAT or a proxy of a service provider is present between a service provider network and a user host which is an actual destination, addresses of the destination and a source are converted into an address of the service provider. For this reason, the source address of a packet which reaches the destination is the service provider and return packet is naturally comes back to the service provider network. In this way, traffic from the user to the Internet can also be redirected to the service provider network. On the other hand, since the original address information is replaced by the NAT or a proxy, access analysis on the user side is difficult. Furthermore, since the redirection of traffic depends on the DNS name resolution, traffic accessing by directly designating an IP address of the user without using the DNS is invalid.

On the other hand, since redirection using the BGP uses the user's IP address itself, there is no problem that the original address information or access directly designating an IP address becoming invalid. Here, since route control using the BGP is destination based traffic control, it is not possible to redirect traffic from the user to the Internet to the service provider network. Therefore, it is difficult to use this method for session aware network services such as stateful firewalls, which restricts services which can be provided by network service providers.

Any methods using the DNS and the BGP are traffic redirection methods for access from the Internet to a specific device and it is not possible to redirect traffic from a specific device to the Internet.

With regard to methods of redirecting specific traffic using the PBR, it is necessary to set a policy to all the interfaces through which the traffic enters to the user network. Thus, maintaining all routers at the user locations or dynamic router configuration changes are difficult.

As described above, in the related art, there is a problem that it is not easy to redirect traffic from a specific device to the Internet.

In view of the above-described circumstances, an objective of the present invention is to provide a technique capable of easily redirecting traffic from a specific device to the Internet.

Solution to Problem

An aspect of the present invention is a communication control method which performs route control in a communication system comprising: a specific network constituting the Internet; a first network configured to accommodate a specific device connected to the specific network; a second network provided between the specific network and the first network; and a processing device configured to perform predetermined processing on the basis of a packet transmitted between the specific network and the first network, the communication control method comprising: causing a path setting device in the communication system to execute a communication route-setting process comprised of, in accordance with first routing information defining a path leading from the first network to the specific network to be branched in the second network, controlling a path so that a first path of the branched path is set as a path via the processing device, and a second path of the branched path is set as a path leading to the specific network.

An aspect of the present invention is the communication control method in which the processing device is accommodated in a network other than the specific network and the first network and; the communication control method further includes a process of controlling, by the path setting device, a path so that communication leading to the specific network via the first path leads to the processing device.

An aspect of the present invention is the communication control method in which the communication route-setting process further includes a process of causing the path setting device to output first routing information illustrated below using a first routing protocol for controlling a path between the specific network and the first network and the first routing information includes information which designates a transmission destination so that at least a part of communication from the specific device is transferred to a relay device provided in the first path.

An aspect of the present invention is the communication control method which further comprising: a process of controlling, by the path setting device, a path so that a tunnel is formed in a part of the first path, wherein a packet of communication via the processing device is transferred via the tunnel.

An aspect of the present invention is the communication control method in which a plurality of redirection destinations of at least a part of communication from the specific device are provided in a network that the processing device is accommodated and the communication control method further includes a process of controlling, by the path setting device, a path so that a tunnel is formed for each redirection destination.

An aspect of the present invention is the communication control method in which the communication route-setting process further includes a control process of, controlling a path leading from the specific network to the first network to branch using second routing information defining to be branched in the second network and controlling a path so that a third path of the branched path is set as a path which includes passing through the processing device, and a fourth path of the branched path is set as a path leading to the first network.

An aspect of the present invention is the communication control method in which the control process further perform a process illustrated below, the third path is set as a path leading to a predetermined address space including an address of the specific device via the processing device, and the fourth path is set as a path leading to the first network in which the predetermined address space is excluded from an address space of the first network.

An aspect of the present invention is the communication control method which further comprising: causing the path setting device to perform control so that the communication leading to the specific device via the third path leads to the processing device.

An aspect of the present invention is the communication control method according to any one of claims 6 to 8 in which the communication route-setting process further includes a process of causing the path setting device to output second routing information and third routing information illustrated below using a second routing protocol for controlling a path between the specific network and the first network is further provided, the second routing information includes address information indicating an address space of the first network, and the third routing information includes address information indicating a predetermined address space set to be smaller than the address space of the first network.

An aspect of the present invention is a communication control device which performs route control in a communication system includes: a specific network constituting the Internet; a first network configured to accommodate a specific device connected to the specific network; a second network provided between the specific network and the first network; and a processing device configured to perform predetermined processing on the basis of a packet transmitted between the specific network and the first network, the communication control device comprising: a path setting device which, in accordance with first routing information defining a path leading from the first network to the specific network to be branched in the second network, controlling a path so that a first path of the branched path is set as a path via the processing device, and a second path of the branched path is set as a path leading to the specific network.

An aspect of the present invention is a program causing a computer of a communication system including: a specific network constituting the Internet, a first network configured to accommodate a specific device connected to the specific network, a second network provided between the specific network and the first network, and a processing device configured to perform predetermined processing on the basis of a packet transmitted between the specific network and the first network to execute to execute a step of controlling a path in which, in accordance with first routing information defining a path leading from the first network to the specific network to be branched in the second network, controlling a path so that a first path of the branched path is set as a path via the processing device, and a second path of the branched path is set as a path leading to the specific network.

Advantageous Effects of Invention

According to the present invention, it is possible to easily perform redirection with respect to traffic from a specific device to the Internet.

DESCRIPTION OF EMBODIMENTS

An embodiment of the present invention will be described below with reference to the drawings.

Figure 1:
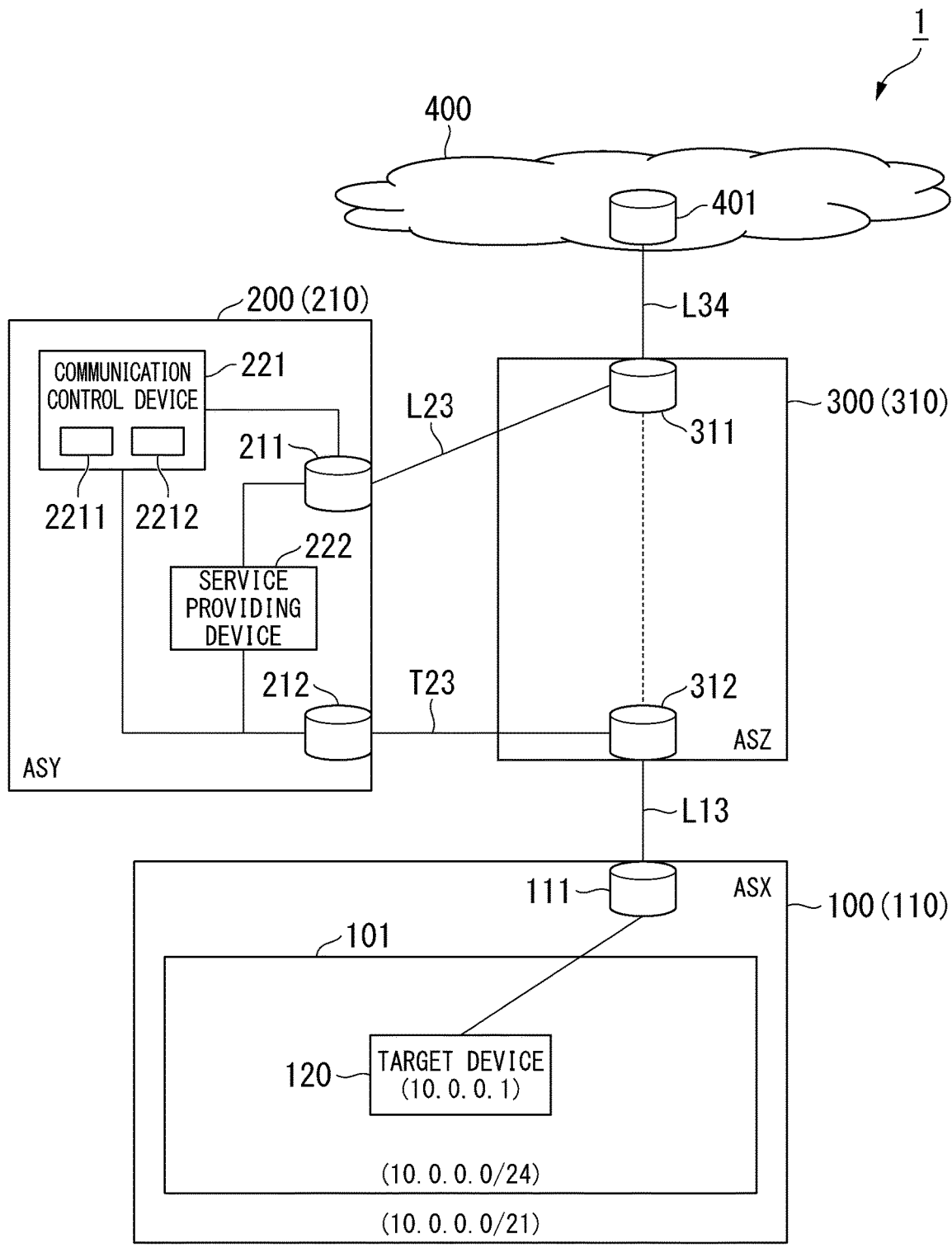
FIG. 1 is a constitution diagram of a communication system 1 according to an embodiment.

FIG. 1 is a constitution diagram of a communication system 1 according to an embodiment. The communication system 1 illustrated in FIG. 1 includes an autonomous system (AS)X 110, an ASY 210, an ASZ 310, and a network 400 (a specific network). The network 400 is a specific network which constitutes the Internet and is constituted of one or more autonomous systems. The network 400 is constituted to include, for example, a router 401 and routing information is shared between the router 401 and the other routers (not shown) included in the network 400.

The ASX 110, the ASY 210, and the ASZ 310 are autonomous systems (ASs). The ASX 110, the ASY 210, and the ASZ 310 correspond to a network 100 (a first network), a network 200, and a network 300 (a second network).

Here, it is assumed that the network 100 corresponding to the ASX 110 is identified by a network address (a prefix) "10.0.0.0/21" It is assumed that a network 101 is provided on the network 100 and the network 101 is identified by a network address (a prefix) "10.0.0.0/24"

The ASX 110 includes a router 111 and a target device 120 (a specific device).

The target device 120 is, for example, a communication device to be attacked which is a transmission destination of communication forming aggressive traffic. Furthermore, the target device 120 is, for example, a communication device which communicates with the network 400. It is assumed that an IP address (a network address) in the network 101 is assigned to the target device 120, and for example, the address thereof is identified as "10.0.0.1"

Routing information is shared between the router 111 and the other routers (not shown) included in the network 100 and the router 111 performs route control for communication in the ASX 110. The router 111 is connected to an external network and advertises routing information on each AS corresponding to a network of a connection destination. For example, the router 111 is connected to the ASZ 310 via a logical path L13. The router 111 transfers traffic addressed to the target device 120 to the target device 120 and transfers the traffic transmitted from the target device 120 to the ASZ 310.

The ASZ 310 includes a router 311 and a router 312. Each of the router 311 and the router 312 are connected to an external network and advertise routing information on each AS corresponding to a network of a connection destination. For example, the router 311 is connected to the router 401 of the network 400 via a logical path L34. Furthermore, the router 311 is connected to the ASY 210 via a logical path L23.

The router 312 is connected to the ASX 110 via the logical path L13. Furthermore, the router 312 is connected to the ASY 210 via a tunnel T23 forming a logical path. The tunnel T23 transparently relays an IP packet between the ASY 210 and the ASZ 310 and may be configured through, for example, a method of relaying an encapsulated IP packet (for example, generic routing encapsulation: GRE). The router 312 includes a main routing table and a virtual routing and forwarding (VRF) table corresponding to a service providing device 222.

It is assumed that the VRF table of the router 312 is assumed to be set so that "a router 212" is designated to a default route such that a packet from the target device 120 flows to the ASY 210 and "a router 111" is designated to a default route such that a packet addressed to the target device 120 is transferred to the target device 120. As a method of designating a path addressed to the target device 120, it is conceivable to dynamically copy or statically set the route of the target device 120 from the main routing table of the router 312.

Routing information is shared between the router 311 and the router 312 and the router 311 and the router 312 perform route control for communication in the ASZ 310.

The ASY 210 includes a router 211, a router 212, a communication control device 221, and the service providing device 222 (a processing device). The router 211 and the router 212 are connected to the network 300 which is an external network and advertise routing information on the ASZ 310 corresponding to the network 300 of a connection destination. For example, the router 211 is connected to the ASZ 310 via the logical path L23. The router 212 is connected to the ASZ 310 via the tunnel T23 forming the logical path.

As the router 212, a router in which a routing table is set so that "a service providing device 222" is designated to a default route such that a packet flows to the service providing device 222 and "a router 312" is designated to such that a packet addressed to the target device 120 is transferred to the target device 120 is set. Here, when the service providing device 222 is an L3 device, the service providing device 222 is set as a default route. However, when the service providing device 222 is an L2 device, a router which is before the service providing device 222 is set as a default route. Although FIG. 1 illustrates a case in which the router 211 and the router 212 are constituted to be separate, but it is not limited to, and the present invention may be constituted with an integrated device and connection in the network 200 may have a constitution other than that illustrated in the drawings.

The communication control device 221 controls a communication path in the communication system 1 to control an influence of aggressive traffic addressed to the target device 120 to be reduced. Furthermore, the communication control device 221 controls the communication path in the communication system 1 to control traffic from the target device 120 to the network 400 to be redirected to the network itself.

For example, the communication control device 221 includes a path setting device 2211 and a communication control device 2212. The path setting device 2211 sets a communication path leading from the network 400 to the network 101 (hereinafter referred to as "a downlink path") and a communication path leading from the network 101 to the network 400 (hereinafter referred to as "an uplink path").

To be specific, the path setting device 2211 controls the ASZ 310 such that the uplink path in the network 300 which is on a communication path between the network 400 and the network 101 is branched. The path setting device 2211 sets a first path of the branched path as a path leading to the router 212 included in the ASY 210. Furthermore, the path setting device 2211 sets a second path of the branched path as a path leading to the network 400 via the router 311. The path setting device 2211 dynamically controls the uplink path using the above-described determined routing information (a first routing information). For example, the path setting device 2211 uses a BGP Flowspec (a first routing protocol) in the uplink path.

Also, the path setting device 2211 performs control so that a tunnel is formed in a part of the first path. To be specific, the path setting device 2211 performs control so that a tunnel is formed for the router 212. Thus, a tunnel is formed between the router 212 and the router 312.

The path setting device 2211 controls the ASZ 310 to branch the downlink path in the network 300 which is on a communication path between the network 400 and the network 101. The path setting device 2211 sets a third path of the branched path as a path leading to the target device 120. Furthermore, the path setting device 2211 sets a fourth path of the branched path as a path leading to the network 101 in which an address space of the target device 120 is excluded from an address space of the network 101. That is to say, the path setting device 2211 sets the fourth path as a path leading to any of the remaining address spaces in which the address space (10.0.0.1) of the target device 120 is excluded from the address space (10.0.0.0/24) of the network 101. The path setting device 2211 dynamically controls the downlink path using the above-described determined routing information.

For example, the path setting device 2211 uses the BGP (a second routing protocol) in the downlink path. As a method using the BGP, the well-known technique disclosed in paragraph 0007 (for example, the technique disclosed in Japanese Unexamined Patent Application, First Publication No. 2014-229982) may be used and a technique of setting the third path of the branched path as a path leading to the target device 120 assigned to a predetermined address space and setting the fourth path of the branched path as a path leading to the address space of the network 101 in which the address space of the target device 120 is excluded from the address space of the network 101 using the above-described the BGP may be used.

The communication control device 2212 controls the service providing device 222 so that the service providing device 222 which restricts communication leading to the predetermined address space is provided on the third path, the service providing device 222 restricts communication leading to the predetermined address space via the third path when a predetermined constraint condition is satisfied, and communication leading to the predetermined address space via the third path is allowed when the constraint condition is not satisfied.

The service providing device 222 is provided on the ASY 210 and performs predetermined processing for a packet redirected from the ASZ 310. Examples of the predetermined processing include security processing regarding for example Web filtering, anti-virus, anti-spam, and an intrusion detection system (IDS)/intrusion prevention system (IPS). Here, as an example of security processing, the service providing device 222 restricts communication according to a predetermined condition. The service providing device 222 restricts communication leading to the target device 120 when a predetermined constraint condition is satisfied and allows communication leading to the target device 120 when a constraint condition is not satisfied.

The above-described processing in the service providing device 222 may be configured to be performed in accordance with control from the communication control device 221. The service providing device 222 may be, for example, a unified threat management (UTM) device or may have some functions such as a stateful firewall, a transparent cache, a deep packet inspection (DPI), a URL filter, and a WPA. In the embodiment, a case in which the service providing device 222 performs security processing as predetermined processing will be described as an example.

Figure 2:
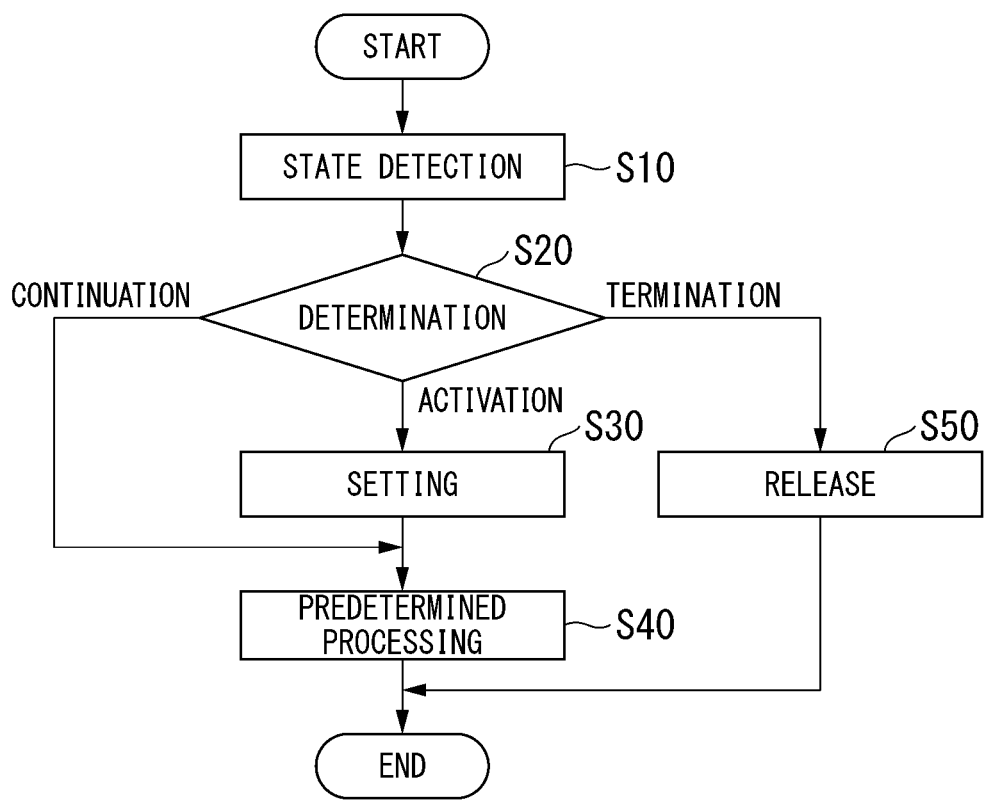
FIG. 2 is a flowchart for describing a flow of processing in an ASY 210.

A process in the ASY 210 will be described below. FIG. 2 is a flowchart for describing a flow of processing in the ASY 210.

The communication control device 221 acquires data used for designating each communication state detected in the ASX 110 and data used for designating each communication state detected in the service providing device 222 (Step S10). The communication control device 221 determines the communication state of the ASX 110 using the acquired data (Step S20).

When abnormal traffic is detected through the determination of Step S20 and a countermeasure function is not in operation, the communication control device 221 controls a state of the communication path of the service providing device 222 and the ASZ 310 to activate the countermeasure function (Step S20—activation). A method of activating the countermeasure function will be described in detail later (Step S30). The service providing device 222 determines a packet supplied via the ASZ 310 in the uplink path or the downlink path and performs security processing in accordance with the determination result (Step S40). For example, in the downlink path, the service providing device 222 performs a filtering process of restricting the packet when a predetermined constraint condition is satisfied and allowing the packet when a constraint condition is not satisfied.

On the other hand, when the countermeasure function is in operation and abnormal traffic continues to be detected through the determination of Step S20, the communication control device 221 causes the countermeasure function to continue through the process of Step S40 (Step S20—continuing).

I, when the countermeasure function is in operation and abnormal traffic is not detected through the determination of Step S20, the communication control device 221 cancels the countermeasure function which is in operation (Step S20—end), returns the communication path to a normal state before the countermeasure function was activated, and ends the process using the service providing device 222 (Step S50).

With the above-described procedure, the communication system 1 can reduce traffic for aggressive communication. Although a procedure of switching between a process in a normal condition and a process in a countermeasure condition is included in the above-described procedure, countermeasure may be executed at constantly.

Figure 3:
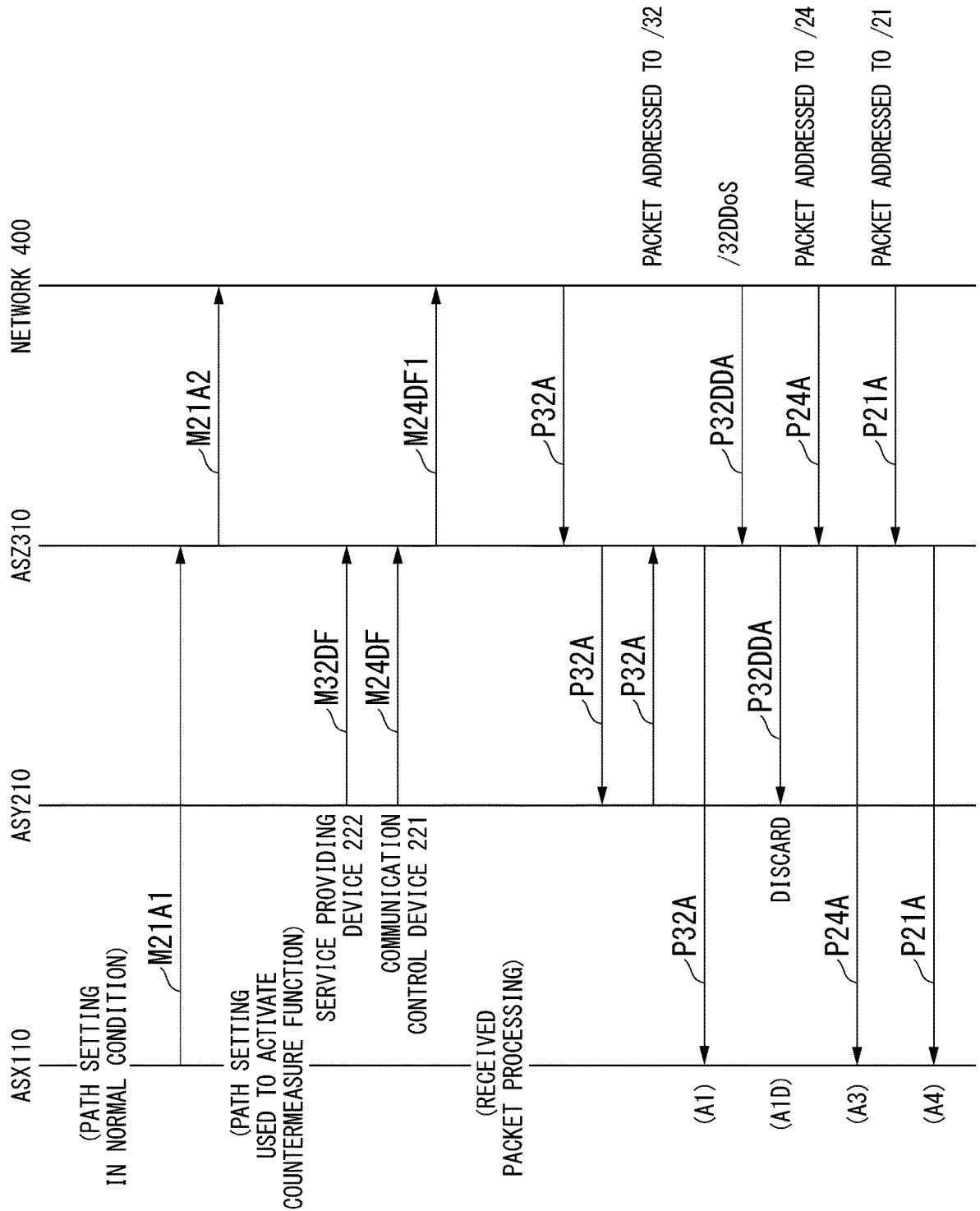
FIG. 3 is a sequence diagram illustrate an action of a countermeasure function in a downlink path using the communication system 1 according to the embodiment.

A countermeasure function in the downlink path using the communication system 1 will be described below with reference to FIGS. 3 and 4. FIG. 3 is a sequence diagram illustrate an action of the countermeasure function in the downlink path by the communication system 1 according to the embodiment.

(Setting of Communication Path in Normal Condition)

First, a communication path in a normal condition is set. The ASX 110 advertises routing information M21A1 on the ASZ 310. The routing information M21A1 advertised by the ASX 110 includes, for example, data that designate "10.0.0.0/21" as prefixes and "X" as an AS path (AS-PATH) and "a router 111" as a next hop (Next-hop), respectively. The ASZ 310 shares routing information in the ASZ 310 in response to the reception of the routing information M21A1 and advertises the routing information M21A2 on the network 400.

The routing information M21A2 advertised by the ASZ 310 includes, for example, data obtained by designating "10.0.0.0/21" as prefixes and "ZX" as an AS path and "a router 311" as a next hop, respectively. "X" "Y" and "Z" designating AS paths indicate the ASX 110, the ASY 210, and the ASZ 310. For example, it is assumed that when described as "ZX" as described above AS paths are listed in the order of "X" and "Z." The same applies to the following description.

The router in the network 400 obtains the above-described routing information M21A2 and updates the held routing information.

(Path Setting Used to Activate Countermeasure Function)

The communication control device 221 controls the router 211 or the service providing device 222 to generate routing information M32DF. The routing information M32DF includes data obtained by designating "10.0.0.1/32" as prefixes and "YX" as an AS path and "a router 211" as a next hop, respectively. In addition, the communication control device 221 generates routing information M24DF. For example, the routing information M24DF includes data obtained by designating "10.0.0.0/24" as prefixes and "YX" as an AS path and "a router 111" as a next hop, respectively.

In the designate of the AS path, an attaching "X" to the beginning of the AS path enable set a path for countermeasures without advertising on an AS path from the ASX 110 side.

Moreover, the communication control device 221 causes the router 211 to advertise the routing information M32DF and the routing information M24DF on the ASZ 310.

The above-described routing information M32DF includes address information indicating a predetermined address space having a prefix designated as, for example, "10.0.0.1/32" and the predetermined address space is set to be smaller than an address space of the network 101 (or the network 100). The routing information M24DF includes address information indicating the address space of the network 101 (or the network 100). The routing information M24DF may further include information used to allow the routing information M32DF to be preferentially selected.

The ASZ 310 shares routing information in the ASZ 310 in response to the reception of the routing information M32DF and the routing information M24DF and advertises the routing information M24DF1 on the network 400. For example, the routing information M24DF1 includes data obtained by designating "10.0.0.0/24" as prefixes and "ZYX" as an AS path and "a router 311" as a next hop, respectively.

The routers in the network 400 acquire the routing information M24DF1 and update held routing information.

(Transfer of Packet Received from Network 400)

Figure 4:
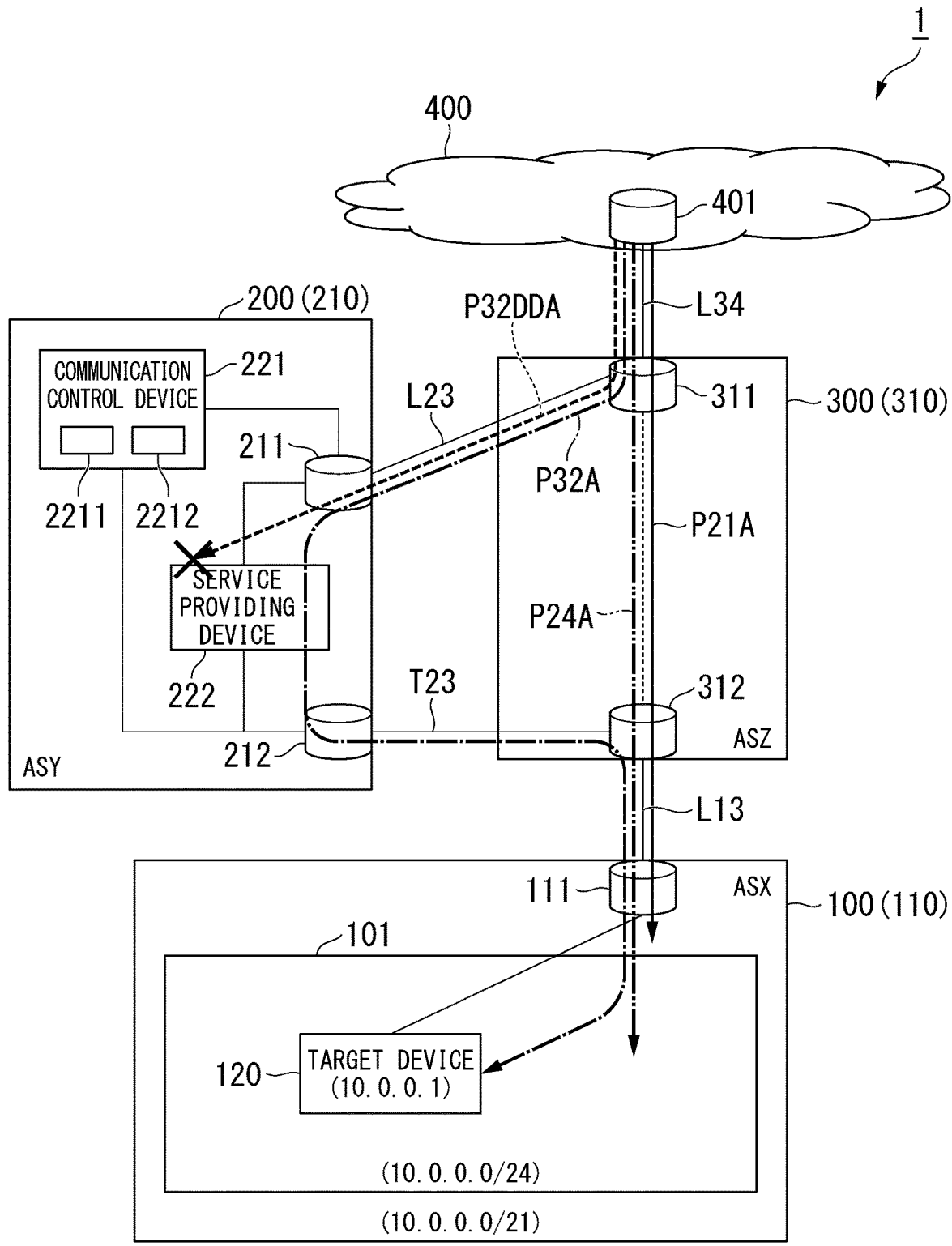
FIG. 4 is a diagram for explaining a communication path when the countermeasure function in the downlink path using the communication system 1 according to the embodiment is in operation.

FIG. 4 is a diagram for explaining a communication path when the countermeasure function in the downlink path using the communication system 1 according to the embodiment is in operation. A description will be provided with reference to FIGS. 3 and 4.

The ASZ 310 performs a transfer process as will be illustrated below in accordance with a transmission destination address of a packet when receiving the packet from the router 401 of the network 400.

Case A1: regarding a case in which the ASZ 310 receives a packet which is not for aggressive communication addressed to the target device 120

The ASZ 310 transfers a packet P32A designating a destination IP address of "10.0.0.1/32" serving as a packet addressed to the target device 120 to the ASY 210 when receiving the packet P32A. The ASY 210 obtains the packet P32A and determines whether the packet P32A is a packet for aggressive communication in the service providing device 222. As a result of the determination, when it is determined that the acquired packet P32A is not a packet for aggressive communication, the service providing device 222 transfers the packet P32A to the ASZ 310 via the tunnel T23. The ASZ 310 transfers the packet P32A to the ASX 110 via the logical path L13. The ASX 110 obtains the transferred packet P32A and the target device 120 receives the packet P32A.

Case A1D: regarding a case in which the ASZ 310 receives a packet for aggressive communication addressed to the target device 120

The ASZ 310 transfers a packet P32DDA designating a destination IP address of "10.0.0.1/32" serving as a packet addressed to the target device 120 to the ASY 210 like Case A1 when receiving the packet P32DDA. The ASY 210 obtains the packet P32DDA and determines whether the acquired packet P32DDA is a packet for aggressive communication in the service providing device 222. As a result of the determination, when it is determined that the acquired packet P32DDA is an aggressive packet, the service providing device 222 discards the packet P32DDA.

Case A3: regarding a case in which the ASZ 310 receives a packet obtained by designating a destination IP address included in "10.0.0.0/24" other than a packet addressed to the target device 120

The ASZ 310 transfers a packet P24A obtained by designating the destination IP address included in "10.0.0.0/24" other than the packet addressed to the target device 120 to the ASX 110 when receiving the packet P24A. The ASX 110 obtains the transferred packet P24A.

Case A4: regarding a case in which the ASZ 310 receives a packet obtained by designating a destination IP address included in "10.0.0.0/21" except "10.0.0.0/24"

The ASZ 310 transfers a packet P21A obtained by designating a destination IP address included in "10.0.0.0/21" except "10.0.0.0/24" to the ASX 110 when receiving the packet P21A. The ASX 110 obtains the transferred packet P21A.

As described above, the communication system 1 according to the embodiment advertises routes using the BGP on the following two routes in the downlink path:

1. A route of "/32" (an IP address of the target device 120) used to designate an IP address of the service providing device 222 or the ASY 210 as a next hop.

2. A route of "/24 (an IP address space which includes the target device 120 and in which a prefix is designated as "/24 or more")" in which the ASX 110 is added to an AS path and a next hop is designated as an IP address of the router 112 of the ASX 110.

Figure 5:
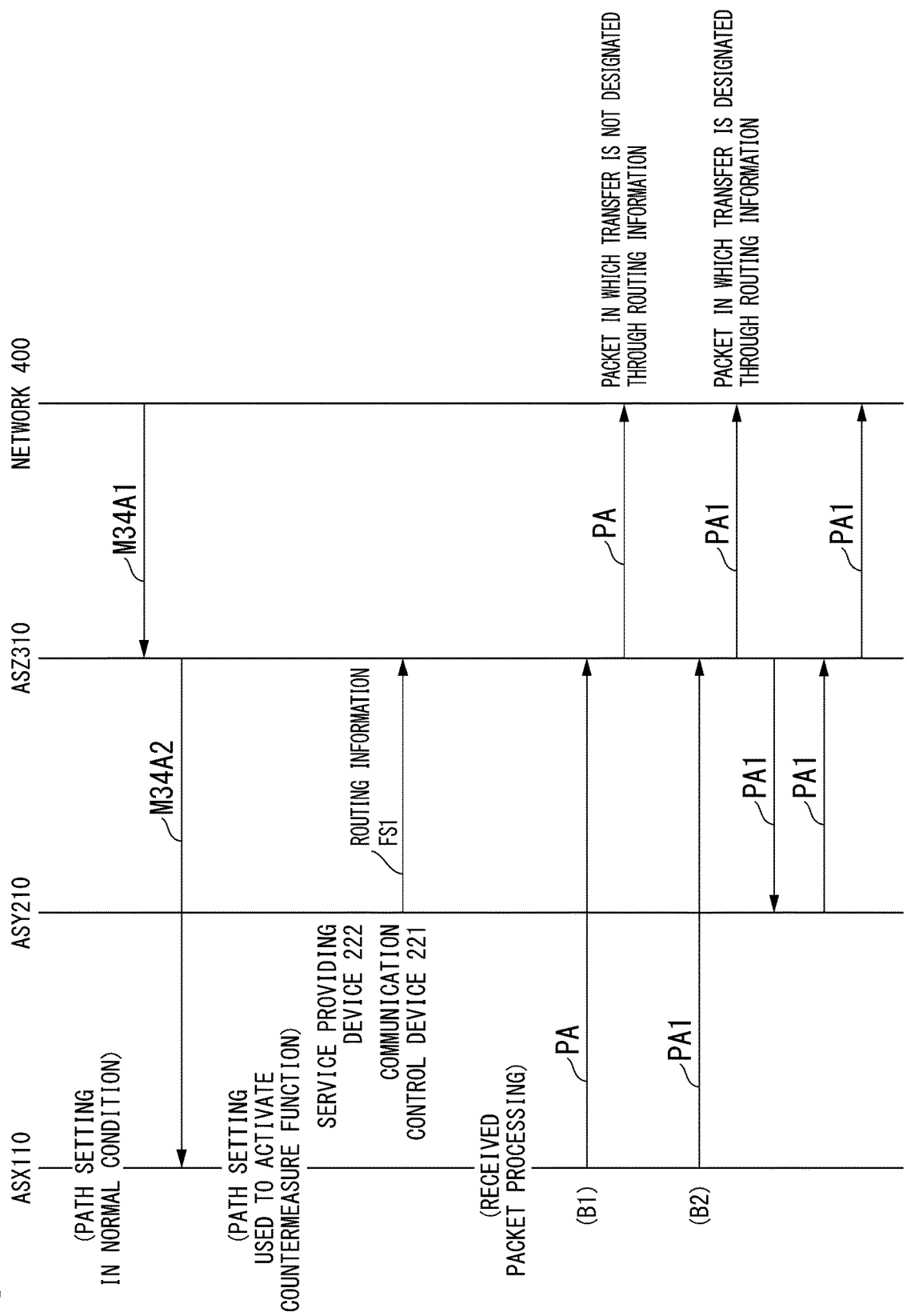
FIG. 5 is a sequence diagram for describing an action of a countermeasure function in an uplink path using the communication system 1 according to the embodiment.

A countermeasure function in the uplink path using the communication system 1 will be described below with reference to FIGS. 5 and 6. FIG. 5 is a sequence diagram for describing an action of the countermeasure function in the uplink path using the communication system 1 according to the embodiment.

(Setting of Communication Path in Normal Condition)

First, a communication path in a normal condition is set. The network 400 advertises routing information M34A1 on the ASZ 310. The ASZ 310 shares routing information in the ASZ 310 in response to the reception of the routing information M34A1 and advertises routing information M34A2 on the ASX 110. The routers in the ASX 110 acquire the routing information M34A2 and update held routing information.

(Path Setting to Activate Countermeasure Function)

The communication control device 221 controls the router 211 or the service providing device 222 to generate routing information FS1. The routing information FS1 includes data designating a packet to be transferred to the router 212. For example, the routing information FS1 can be designated by any of a transmission source IP address (srcIP), a destination IP address (dst IP), a transmission source port number (src Port), and a transmission destination port number (dst Port) or a combination thereof. Thus, a path for countermeasures in the uplink path is set. Moreover, the communication control device 221 causes the router 211 to advertise the routing information FS1 on the ASZ 310. The ASZ 310 shares the routing information in the ASZ 310 in response to the reception of the routing information FS1.

(Transfer of Packet Received from Network 100)

Figure 6:
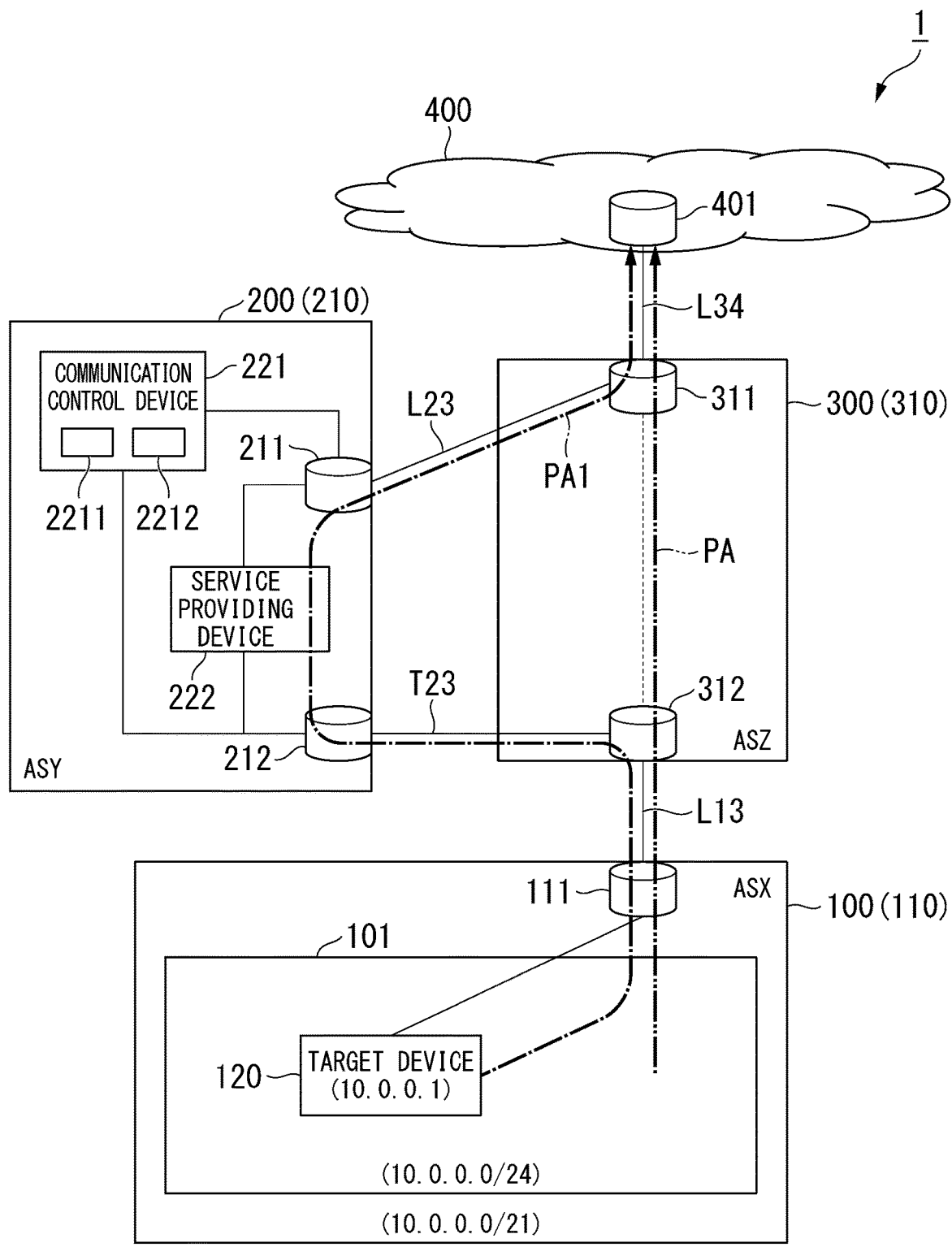
FIG. 6 is a diagram for explaining a communication path when the countermeasure function in the uplink path using the communication system 1 according to the embodiment is in operation.

FIG. 6 is a diagram for explaining a communication path when the countermeasure function in the uplink path using the communication system 1 according to the embodiment is in operation. A description will be provided with reference to FIGS. 5 and 6.

The ASZ 310 performs a transfer process as will be illustrated below in accordance with any of a transmission source IP address, a transmission destination IP address, a transmission source port number, and a transmission destination port number of a packet from the router 111 of the network 100 or a combination thereof when receiving the packet. In the description of FIGS. 5 and 6, a case in which the ASZ 310 performs a transfer process in accordance with a transmission source IP address of a received packet will be described.

Case B1: regarding a case in which the ASZ 310 receives a packet that is not designated as transferred through routing information (a packet whose transmission source IP address is not the target device 120)

The ASZ 310 transfers a packet PA to the network 400 through a normal path (a path according to the main routing table) when receives the packet PA whose transmission source IP address is not the target device 120. Packet PA is transferred via the network 400 and a device which is a transmission destination receives the packet PA.

Case B2: regarding a case in which the ASZ 310 receives a packet that as a transferred packet is designated through routing information (a packet whose transmission source IP address is the target device 120)

The ASZ 310 transfers a packet PA1 to the VRF when receives the packet PA1 whose transmission source IP address is the target device 120. The VRF transfers the transferred packet PA1 to the ASY 210 in accordance with a VRF routing table. The ASY 210 obtains the packet PA1 and performs security processing in the service providing device 222.

As the result of the security processing, when it is determined that the packet PA1 is a valid packet (for example, a packet which is not a packet for aggressive communication), the service providing device 222 transfers the packet PA1 to the router 211. When it is determined that the packet PA1 is not a valid packet (for example, a packet which is not a packet for aggressive communication), the service providing device 222 discards the packet PA1. The router 211 transfers the packet PA1 to the ASZ 310 via the logical path L23. The ASZ 310 obtains the transferred packet PA1 and transfers the acquired packet PA1 to the network 400. The network 400 obtains the transferred packet PA1 and a device which is a transmission destination receives the packet PAL According to the communication system 1 constituted in this way, it is possible to easily perform redirection for traffic from a specific device to the Internet. To be specific, the communication control device 221 advertises paths so that communication from the target device 120 leads to the ASZ 310 using a function of the BGP Flowspec. Thus, it is possible to easily perform redirection for traffic from the specific device to the Internet.

Also, it is possible to secure the transparency of the original IP address, which is a problem when the NAT or a proxy is used in combination with the DNS and to cope with the direct access by designating a user IP address. Furthermore, it is possible to perform redirection of traffic leading from a user to the Internet, which cannot be realized using the BGP and redirection of communication leading from a specific device to the Internet, which cannot be realized using any of the DNS and the BGP.

It is possible to introduce a device which ascertains hi-directions of communication such as a stateful firewall as long as the device is on a traffic path redirected transparently and bi-directionally and the same constitution as that of the device incorporated into a host in the user's network in-line can be realized outside of the user's network. That is to say, it is possible to develop a device or a service which can be used only when being currently disposed in the user's house on a network outside of the user's network and the user can have an advantage obtained when the using of the device is not restricted within the user's house and an advantage in which the user is free from a physical house construction.

Also, in the communication system 1, by providing two paths in the downlink path, it is possible to perform route control to designate a communication path as illustrated in FIG. 3. In this way, the communication system 1 enables the provision of a low-latency DDoS countermeasures service without the need to change setting of the router in the ASX 110. Thus, the communication system 1 can enhance the convenience of the communication system.

Modified Example

In the communication system 1, the filter may be set so that the path advertised by the BGP Flowspec is not valid at an interface connected to an upper router (for example, the router 311) through the router 312 to avoid a traffic loop.

Although one target device 120 is provided in FIG. 1, a plurality of target devices 120 may be provided.

The communication control device 221 may be configured not to include the communication control device 2212.

Although a case in which the network of the target device 120 is one AS has been described as an example in the embodiment, the network of the target device 120 may not be an AS.

Although a case in which the ASY 210 and the ASZ 310 are independent ASs has been described as an example in the embodiment, the ASY 210 and the ASZ 310 may be configured as one AS.

Although a case in which the routing tables of the routers (for example, the router, the VR, and the VRF) are statically set has been described as an example in the embodiment, the routing tables of the routers may be dynamically set.

Although a constitution in which as the activation condition of a countermeasure function that the abnormal traffic is detected and that the countermeasure function is not in operation is illustrated in the embodiment, the activation condition of the countermeasure function needs to be not limit to this. For example, when the communication control device 221 includes an external application programming interface (API), an activation instruction from an external program via the API may be used as an activation condition and a manual activation instruction may be used as an activation condition of the countermeasure function. Thus, the countermeasure function can be activated not only when abnormal traffic is detected but also the case of normal traffic.

The service providing device 222 may be configured to perform processing other than the security processing as predetermined processing. For example, the service providing device 222 may perform processing for a transparent cache and processing for the WPA. When the service providing device 222 performs the processing for the transparent cache, the service providing device 222 functions as a cache device between the target device 120 and the network 400. Furthermore, when the service providing device 222 performs the processing for the WPA, the service providing device 222 functions as a device configured to encrypt a packet in at least a part of communication performed between the target device 120 and the network 400.

As described above, the service providing device 222 can be used for applications other than security. Thus, convenience can be improved.

In the communication system 1, a plurality of service providing devices 222 may be provided in the ASY 210.

Figure 7:
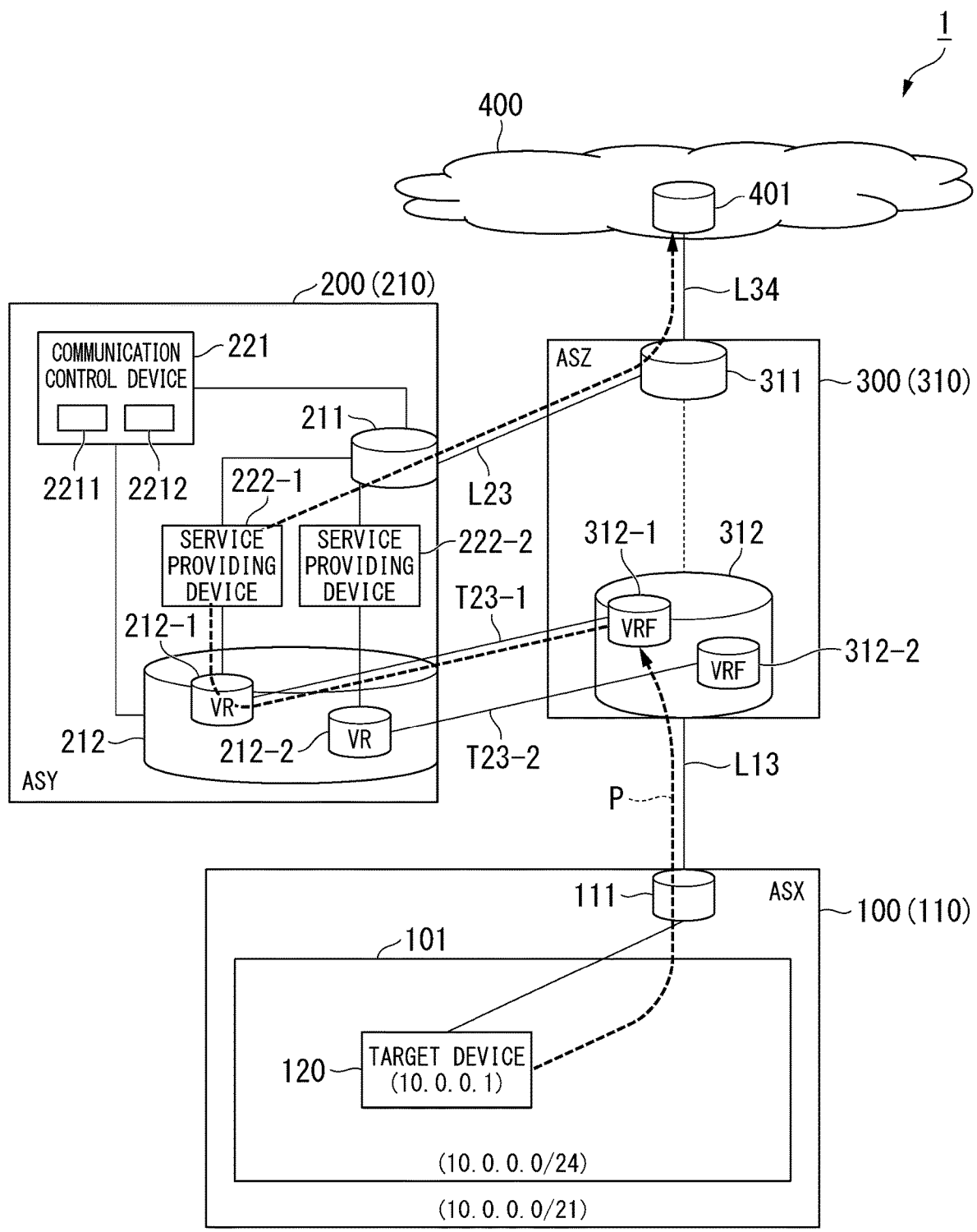
FIG. 7 is a diagram for explaining a communication path in communication system 1 according to the modified example when a countermeasure function in an uplink path is in operation.

When a constitution is provided in this way, in the ASY 210, one router 212 or one virtual router is provided for each service providing device 222. In accordance with the fact that one router 212 or one virtual router is provided for each service providing device 222 in the ASY 210, in the ASZ 310, the router 312 or the virtual router associated with each router 212 or virtual router is provided. Moreover, the associated routers are connected through tunnels. FIG. 7 illustrates a specific constitution. FIG. 7 illustrates a case in which virtual routers are provided in an ASY 210 and an ASZ 310 as an example.

FIG. 7 is a diagram for explaining a communication path in communication system 1 according to the modified example when a countermeasure function in an uplink path is in operation. As illustrated in FIG. 7, the ASY 210 includes a router 211, a router 212, a communication control device 221, and a plurality of service providing devices 222-1 and 222-2. Here, the router 212 includes a plurality of virtual routers (VRs) 212-1 and 212-2. The ASZ 310 includes a router 311 and a router 312. Here, the router 312 includes a plurality of VRFs 312-1 and 312-2. The VR 212-1 and the VRF 312-1 are connected to each other via a tunnel T23-1. The VR 212-2 and the VRF 312-2 are connected to each other via a tunnel T23-2.

It is assumed that a routing table of the VR 212-1 is set so that "the service providing device 222-1" is designated as a default route such that a packet from a target device 120 flows to the service providing device 222-1 and "the router 312" is designated such that a packet addressed to the target device 120 is transferred to the target device 120. Furthermore, it is assumed that a routing table of the VR 212-2 is set so that "the service providing device 222-2" is designated as a default route such that a packet from the target device 120 flows to the service providing device 222-2 and "the router 312" is designated such that a packet addressed to the target device 120 is transferred to the target device 120.

It is assumed that a routing table of the VRF 312-1 is set so that "the router 212" is designated as a default route such that a packet from the target device 120 flows to the ASY 210 and "a router 111" is designated such that a packet addressed to the target device 120 is transferred to the target device 120. Furthermore, it is assumed that a routing table of the VRF 312-2 is set so that "the router 212" is designated as a default route such that a packet from the target device 120 flows to the ASY 210 and "the router 111" is designated such that a packet addressed to the target device 120 is transferred to the target device 120.

Here, it is assumed that routing information FS1 indicates that a packet is transferred to the VRF 312-1 when a transmission source IP address of the packet is the target device 120. In this case, the router 312 transfers a packet P transmitted from the target device 120 to the VRF 312 when it receives the packet P from router 111 of the network 100. The VRF 312-1 transfers the packet P to the VR 212-1 via the tunnel T23-1 in accordance with the routing table. The VR 212-1 performs security processing on the transferred packet P in the service providing device 222-1.

As a result of the security processing, when it is determined that the packet P is a valid packet (for example, a packet which is not a packet for aggressive communication), the service providing device 222-1 transfers the packet P to the router 211. When it is determined that the packet P is not a valid packet (for example, a packet which is not a packet for aggressive communication), the service providing device 222-1 discards the packet P. The router 211 transfers the packet P to the ASZ 310 via a logical path L23. The ASZ 310 obtains the transferred packet P and transfers the obtained packet P to a network 400. Packet P is transferred via the network 400 and a device which is a transmission destination receives the packet P.

With such a constitution, it is possible to use different service providing devices from the same target device 120. For example, when one service providing device (for example, the service providing device 222-1) which have the DPI function and another service providing device (for example, the service providing device 222-2) which have the WPA function, it is possible to use services using the service providing devices from the same target device 120 as necessary.

The transferring to the VRF 312-2 may be designated in the routing information FS1 when using the service providing device 222-2.

The functions in the above-described embodiments may be realized by a computer. In this case, a program configured to realize such functions is recorded on a computer readable recording medium, the program recorded on the recording medium is read into a computer system and executed so that the functions in the above-described embodiments may be realized. Note that the "computer system" mentioned herein may include an operating system (OS) and hardware such as peripheral devices. Furthermore, the "computer readable recording medium" refers to a storage device such as a flexible disk, a magneto-optical disk, a read only memory (ROM), a portable medium such as a compact disk (CD)-ROM, and a hard disc built in a computer system. In addition, the "computer readable recording medium" may include a medium configured to hold the program dynamically for a short period of time like a communication line when the program is transmitted over a network such as the Internet and a communication circuit such as a telephone line and a medium configured to hold the program for a certain period of time like a volatile memory inside a computer system serving as a server and a client in that case. Furthermore, the program may be used to realize some of the above-described functions. In addition, the above-described functions may be realized using a combination with a program which is already recorded in a computer system. Processing devices instituting the communication systems 1 may be realized by dedicated hardware.

While the embodiment of the present invention has been described in detail above with reference to the drawings, the specific constitution thereof is not limited to this embodiment and designs and the like are included without departing from the gist of the present invention.

REFERENCE SIGNS LIST 100, 200, 300, 400 Network
110 ASX
210 ASY
310 ASZ
111, 211, 212, 311, 312, 401 Router
120 Target device
221 Communication control device
2211 Path setting device
2212 Communication control device
222, 222-1, 222-2 Service providing device
212-1, 212-2 VR
312-1, 312-2 VRF

The invention claimed is:
1. A communication control method which performs route control in a communication system, communication control method comprising a specific network constituting the Internet;
a first network configured to accommodate a specific device connected to the specific network;
a second network provided between the specific network and the first network;
a network configured to accommodate a processing device and connected to the second network; and
the processing device configured to perform predetermined processing on the basis of a packet transmitted between the specific network and the first network,
the communication control method comprises:
controlling a path so that a first path of the path leading from the first network to the specific network is branched in the second network is set as a path leading to the specific network via the network;
controlling a path so that second path of the path leading from the first network to the specific network is branched in the second network is set as a path leading to the specific network without passing through the network;
a plurality of redirection destinations of at least a part of communication from the specific device is provided in the network and
the communication control method further includes a process of controlling a path so that a tunnel is formed for each redirection destination, and controlling the transferring of a packet to the redirection destination according to the information in the packet sent from the specific device.

2. The communication control method according to claim 1, wherein
the communication control method further comprising:
controlling a path so that communication leading to the specific network via the first path leads to the processing device.

3. The communication control method according to claim 1, further comprising:
outputting to the second network first routing information illustrated below using a first routing protocol for controlling a path between the specific network and the first network; and
the first routing information includes information which designates a transmission destination so that at least a part of communication from the specific device is transferred to a relay device connected to the second network; and
the relay device is accommodated the network and sets so that the processing device is designated to a default route such that a packet flows to the processing device.

4. The communication control method according to claim 1, further comprising:
controlling a path so that a tunnel is formed in a part of the first path,
wherein a packet of communication via the processing device is transferred via the tunnel.

5. The communication control method according to claim 1, further comprising:
controlling a path in the second network in accordance with second routing information defining a path leading from the specific network to the first network is branched in the second network;
controlling a path so that a third path of the path leading from the specific network to the first network is branched in the second network is set as a path leading to the first network via the network; and
controlling a path so that a fourth path of the path leading from the specific network to the first network to be branched in the second network is set as a path leading to the first network without passing through the network.

6. The communication control method according to claim 5, further comprising:
controlling a path so that the third path is set as a path leading to a predetermined address space including an address of the specific device via the processing device,
controlling a path so that the fourth path is set as a path leading to the first network in which the predetermined address space is excluded from an address space of the first network.

7. The communication control method according to claim 6, further comprising:
controlling a path so that the communication leading to the specific device via the third path leads to the processing device.

8. The communication control method according to claim 5, further comprising:
outputting to the second network second routing information and third routing information illustrated below using a second routing protocol for controlling a path between the specific network and the first network;
the second routing information includes address information indicating an address space of the first network; and
the third routing information includes address information indicating a predetermined address space set to be smaller than the address space of the first network.

9. A communication control device which performs route control in a communication system comprising:
a specific network constituting the Internet;
a first network configured to accommodate a specific device connected to the specific network;
a second network provided between the specific network and the first network;
a network configured to accommodate a processing device and connected to the second network: and
the processing device configured to perform predetermined processing on the basis of a packet transmitted between the specific network and the first network, the communication control device comprising:
a path setting device configured to set a path;
wherein the path setting device controls a path in the second network in accordance with first routing information defining a path leading from the first network to the specific network to be branched in the second network;
wherein the path setting device controls a path so that a first path of the path leading from the first network to the specific network is branched in the second network is set as a path leading to the specific network via the network; and
wherein the path setting device controls a second path of the path leading from the first network to the specific network is branched in the second network is set as a path leading to the specific network without passing through the network;
the network includes a plurality of redirection destinations of at least a part of communication from the specific device: and
the path setting device controls a path so that a tunnel is formed for each redirection destination, and controls the transferring of a packet to the redirection destination according to the information in the packet sent from the specific device.

10. A non-transitory computer readable storage medium that stores program a to be executed by the computer of a communication system comprising:
- a specific network constituting the Internet,
- a first network configured to accommodate a specific device connected to the specific network,
- a second network provided between the specific network and the first network,
- a network configured to accommodate a processing device and connected to the second network, and
- the processing device configured to perform predetermined processing on the basis of a packet transmitted between the specific network and the first network;
- controlling a path in the second network in accordance with first routing information defining a path leading from the first network to the specific network is branched in the second network;
- controlling a path so that a first path of the path leading from the first network to the specific network is branched in the second network is set as a path leading to the specific network via the network; and
- controlling a path so that a second path of the path leading from the first network to the specific network is branched in the second network is set as a path leading to the specific network without passing through network
- a plurality of redirection destinations of at least a part of communication from the specific device is provided in the network, and
- the communication control system further includes a process of controlling a path so that a tunnel is formed for each redirection destination, and controlling the transferring of a packet to the redirection destination according to the information in the packet sent from the specific device.

* * * * *